United States Patent
Yu et al.

(10) Patent No.: US 10,809,858 B2
(45) Date of Patent: Oct. 20, 2020

(54) CAPACITIVE TOUCH SYSTEM AND SENSING METHOD THEREOF

(71) Applicant: Silicon Integrated Systems Corp., Hsinchu (TW)

(72) Inventors: Hsin-Hsuan Yu, Hsinchu (TW); Jiun-Ying Yeh, Hsinchu (TW); Chin-Hua Kuo, Hsinchu (TW); Ying-Jyh Yeh, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 16/101,548

(22) Filed: Aug. 13, 2018

(65) Prior Publication Data

US 2019/0050081 A1    Feb. 14, 2019

(30) Foreign Application Priority Data

Aug. 14, 2017  (TW) .............................. 106127502 A

(51) Int. Cl.
*G06F 3/044*    (2006.01)
*G06F 3/047*    (2006.01)
*G06F 3/041*    (2006.01)
*G06F 3/0354*   (2013.01)

(52) U.S. Cl.
CPC .......... *G06F 3/044* (2013.01); *G06F 3/03545* (2013.01); *G06F 3/047* (2013.01); *G06F 3/0412* (2013.01); *G06F 3/0416* (2013.01); *G06F 2203/04112* (2013.01)

(58) Field of Classification Search
CPC ........ G06F 3/044; G06F 3/047; G06F 3/0412; G06F 3/03545; G06F 2203/04112; G06F 3/0416
See application file for complete search history.

(56) References Cited

U.S. PATENT DOCUMENTS

| | | | | |
|---|---|---|---|---|
| 2007/0109280 | A1* | 5/2007 | Sigona .................... | G06F 3/038 345/177 |
| 2009/0009483 | A1* | 1/2009 | Hotelling .............. | G06F 3/0416 345/173 |
| 2014/0354555 | A1* | 12/2014 | Shahparnia ......... | G06F 3/03545 345/173 |
| 2015/0061704 | A1* | 3/2015 | Liu ......................... | G06F 3/044 324/691 |

* cited by examiner

*Primary Examiner* — Patrick N Edouard
*Assistant Examiner* — Joseph P Fox
(74) *Attorney, Agent, or Firm* — Mark M. Friedman

(57) ABSTRACT

A capacitive touch system and a sensing method thereof are disclosed. The capacitive touch system includes a touch panel including a plurality of driving electrodes and a plurality of sensing electrodes; a touch control chip; and an external device configured to transmit data to the touch control chip. In a position detection mode, the touch control chip drives the driving electrodes, reads a sensing signal from the sensing electrodes, and determines a position of a touch according to the sensing signal. In a data receiving mode, the touch control chip receives the data transmitted by the external device after a time delay period. In the capacitive touch system and the sensing method thereof, the position detection mode and the data receiving mode can be sequentially performed by delaying the time period.

6 Claims, 6 Drawing Sheets

CAPACITIVE TOUCH SYSTEM AND SENSING METHOD THEREOF

TECHNICAL FIELD OF THE DISCLOSURE

The present disclosure relates to touch control technologies, and more particularly to a capacitive touch system and a sensing method thereof.

BACKGROUND OF THE DISCLOSURE

Peripheral products have gradually developed alongside development of touch panels. One type of the peripheral products is an active pen (active stylus). Some of existing active pens have a data transmission function. When an active pen touches a touch panel, the touch panel senses a position touched by the active pen in a first mode. Then, the touch panel is switched to a second mode, and the touch panel receives data transmitted by the active pen.

In the above-mentioned second mode, when the touch of the active pen is near an edge of the touch panel, the touch panel cannot receive complete data transmitted by the active pen. In detail, because the touch is near the edge of the touch panel, the touch panel is switched from the second mode of a current frame to the first mode (i.e., the touch panel senses the position touched by the active pen) of a next frame before the touch panel receives complete data transmitted by the active pen. That is, the touch panel can receive only a part of the data, and thus the determination in the following process is not correct.

Therefore, there is a need to solve the above-mentioned problem in the prior art.

SUMMARY OF THE DISCLOSURE

An objective of the present disclosure is to provide a capacitive touch display system and a sensing method thereof capable of solving the problem in the prior art.

The capacitive touch system of the present disclosure includes a touch panel comprising a plurality of driving electrodes, a plurality of sensing electrodes, a plurality of driving wires, and a plurality of sensing wires, wherein each of the driving electrodes is connected to one of the driving wires, and each of the sensing electrodes is connected to one of the sensing wires; a touch control chip electrically connected to the touch panel; and an external device configured to transmit data to the touch control chip via the touch panel. In a touch detecting mode, the touch control chip drives the driving electrodes via the driving wires, the touch control chip reads a sensing signal from the sensing electrodes via the sensing wires, and the touch control chip determines a position of a touch according to the sensing signal. In a data receiving mode, the touch control chip receives data transmitted by the external device after a time delay period.

In the sensing method of the capacitive touch system of the present disclosure, the capacitive touch system includes a touch panel, a touch control chip, and an external device. The touch panel includes a plurality of driving electrodes, a plurality of sensing electrodes, a plurality of driving wires, and a plurality of sensing wires. Each of the driving electrodes is connected to one of the driving wires, and each of the sensing electrodes is connected to one of the sensing wires. The sensing method of the capacitive touch system includes driving the driving electrodes via the driving wires by the touch control chip, reading a sensing signal from the sensing electrodes via the sensing wires by the touch control chip, and determining a position of a touch according to the sensing signal by the touch control chip in a touch detecting mode; and receiving data transmitted by the external device by the touch control chip after a time delay period in a data receiving mode.

In the capacitive touch system and the sensing method thereof, the position detecting mode and the data receiving mode can be sequentially performed by delaying the time period. Furthermore, the capacitive touch system and the sensing method thereof of the present disclosure provide two driving methods, so as to avoid that complete data cannot received.

DETAILED DESCRIPTION OF THE DISCLOSURE

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
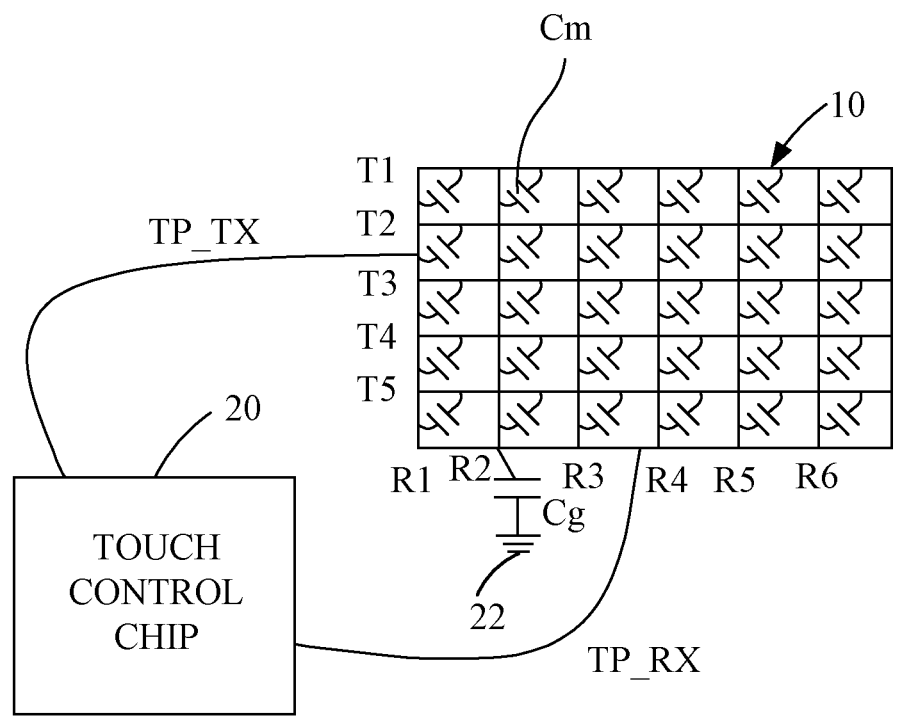
FIG. 1 illustrates a capacitive touch system in accordance with an embodiment of the present disclosure.
Figure 2:
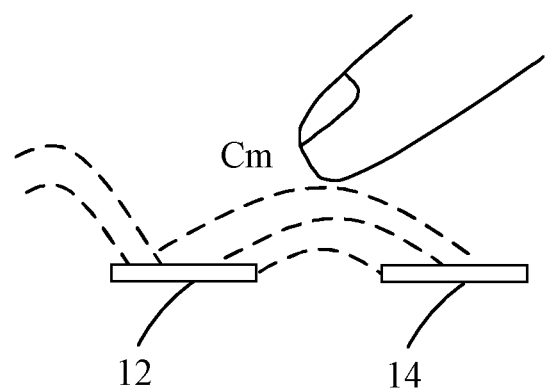
FIG. 2 illustrates that a coupling capacitance Cm is formed between a driving electrode and a sensing electrode of a touch panel.
Figure 3:
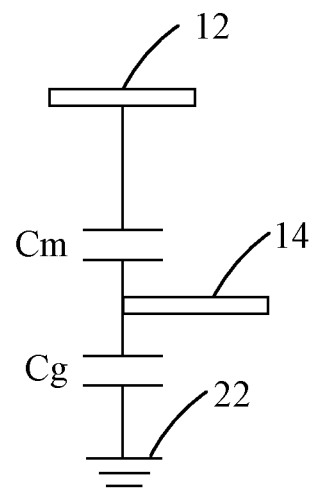
FIG. 3 illustrates that a relation between the coupling capacitance Cm and a ground capacitance Cg of the touch panel.

Please refer to FIG. 1 to FIG. 3. FIG. 1 illustrates a capacitive touch system in accordance with an embodiment of the present disclosure. FIG. 2 illustrates that a coupling capacitance (mutual capacitance) Cm is formed between a driving electrode 12 and a sensing electrode 14 of a touch panel 10. FIG. 3 illustrates that a relation between the coupling capacitance Cm and a ground capacitance Cg of the touch panel 10. The capacitive touch system includes the touch panel 10 and a touch control chip 20. The touch panel 10 may be a capacitive touch panel.

The touch panel 10 generally includes a plurality of electrodes arranged in a matrix and a plurality of conductive wires connected to the electrodes. These electrodes are made of indium tin oxide (ITO) and have a bar or diamond shape. In a mutual capacitance framework, these electrodes include a plurality of driving electrodes 12 and a plurality of sensing electrodes 14. Correspondingly, the conductive wires also include a plurality of driving wires T1-T5 and a plurality of sensing wires R1-R6. Each of the driving electrodes 12 is connected to one of the driving wires T1-T5. Each of the sensing electrodes 14 is connected to one of the sensing wires R1-R6. A position of each of the driving electrodes 12 corresponds to a position of each of the sensing electrodes 14. The driving wires T1-T5 are perpendicular to the sensing wires R1-R6. In a driving scheme of the mutual capacitance framework, a panel driving signal TP_TX (TP represents a Touch Panel) is sequentially applied to the driving electrodes 12 via the driving wires T1-T5. The panel driving signal TP_TX is usually a pulse signal. Correspondingly, a sensing signal TP_RX is read from the sensing electrodes 14 via the sensing wires R1-R6.

As shown in FIG. 1 to FIG. 3, the coupling capacitance Cm is formed between the driving electrode 12 and the sensing electrode 14. The ground capacitance Cg is formed between the sensing electrode 14 and a ground terminal 22. The coupling capacitance Cm is changed when a finger (or a similar item) approaches, thereby changing the sensing signal TP_RX measured by the sensing electrode 14.

Figure 4:
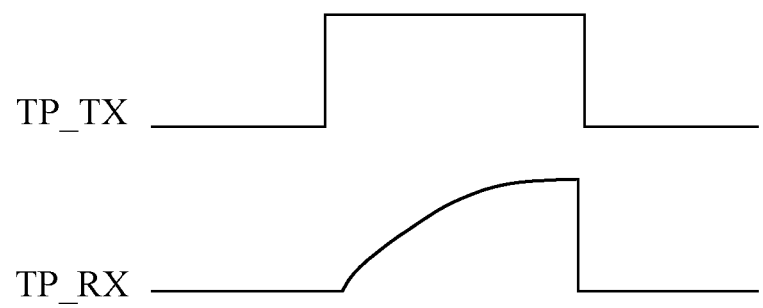
FIG. 4 illustrates that a panel driving signal and a sensing signal that are measured when no finger approaches.
Figure 5:
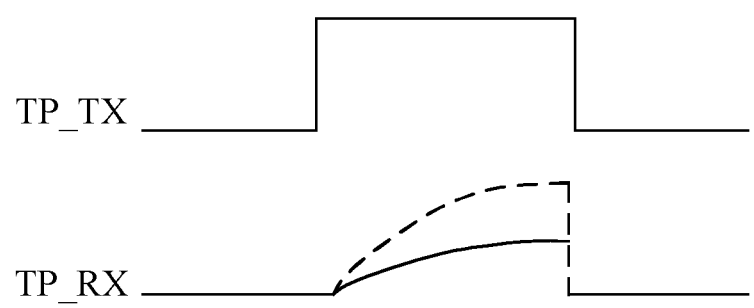
FIG. 5 illustrates that a panel driving signal and a sensing signal that are measured when a finger approaches.

Please refer to FIG. 1 to FIG. 5. FIG. 4 illustrates that the panel driving signal TP_TX and the sensing signal TP_RX that are measured when no finger approaches. FIG. 5 illustrates that the panel driving signal TP_TX and the sensing signal TP_RX that are measured when a finger approaches.

As shown in FIG. 4 and FIG. 5, when the finger approaches, the coupling capacitance Cm between the driving electrode 12 and the sensing electrode 14 in FIG. 2 is affected and thus decreases. Accordingly, the sensing signal TP_RX measured from the sensing electrode 14 via one of the sensing wires R1-R6 decreases as well. The touch control chip 20 in FIG. 1 is configured to sequentially apply the panel driving signal TP_TX to each of the driving electrodes 12 of the touch panel 10 and sequentially read the sensing signal TP_RX from each of the sensing electrodes 14. In this way, the touch control chip 20 can resolve a position of a touch.

A feature of the present disclosure is that the capacitive touch system can detect passive signals (in a position detecting mode) and active signals (data receiving mode) synchronously and does not require to be switched. As shown in FIG. 1, the passive signals are generated by a touch (e.g., a finger) on the touch panel 10, while the active signals are generated by a device capable of transmitting data to the touch control chip 20.

Figure 6:
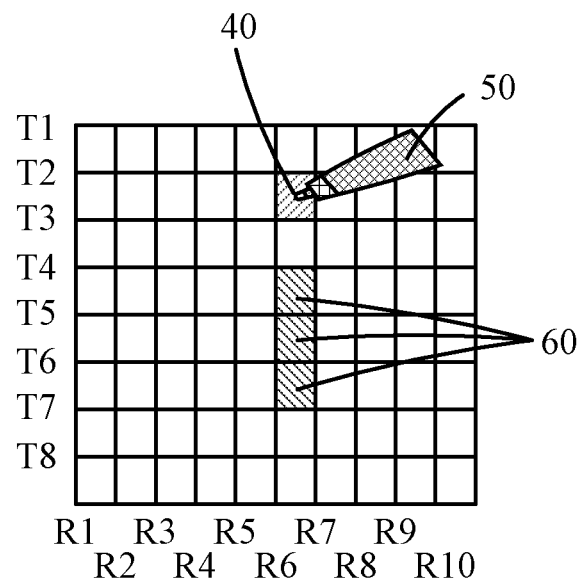
FIG. 6 illustrates that a touch is detected and data is transmitted by an external device.
Figure 7:
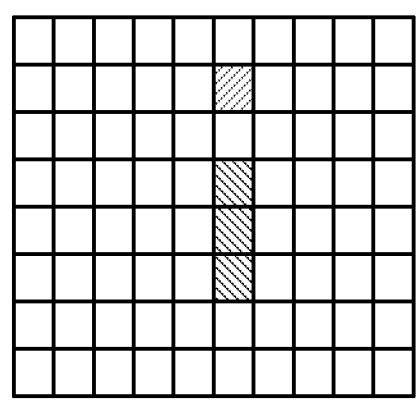
FIG. 7 illustrates a data structure for storing data of the touch and the data transmitted by the external device.

Please refer to FIG. 6 and FIG. 7. FIG. 6 illustrates that a touch 40 is detected and data 60 is transmitted by an external device 50. FIG. 7 illustrates a data structure for storing data of the touch 40 and the data 60 transmitted by the external device 50.

In a position detecting mode, the touch control chip 20 is electrically connected to the touch panel 10 and is configured to output the panel driving signal TP_TX to the touch panel 10. In detail, the touch control chip 20 drives, via the driving wire T1, the driving electrode 12 electrically connected to the driving wire T1. The touch control chip 20 reads, via the sensing wires R1-R10, the sensing signal TP_RX from the sensing electrodes 14 corresponding to the driving electrode 12. Then, the touch control chip 20 sequentially drives, via the driving wires T2-T8, the driving electrodes 12 electrically connected to the driving wires T2-T8. The touch control chip 20 reads, via the sensing wires R1-R10, the sensing signal TP_RX from the sensing electrodes 14. Finally, the touch control chip determines a position (i.e., a coordinate) of the touch 40.

As shown in FIG. 7, the data of the detected touch 40 is stored in a corresponding position of the data structure (in the position detecting mode). After the position detecting mode, the capacitive touch system is switched to a data receiving mode. In detail, the touch control chip 20 receives the data 60 transmitted by the external device 50 after a time delay period. In the present embodiment, the data 60 has a length of driving the three driving wires T4-T6. That is, when the touch control chip 20 drives the three driving wires T4-T6, the touch control chip 20 receives the data 60 transmitted by the external device 50.

The above-mentioned time delay period, for example, may include a time period of delaying to drive at least one of the driving wires T1-T8. In the time period of delaying to drive the at least one of the driving wires T1-T8, the sensing wires R1-R10 do not sense the touch 40 (do not receive signals).

In the capacitive touch system of the present disclosure, the position detecting mode and the data receiving mode can be sequentially performed by delaying the time period, thereby achieving an objective of detecting passive signals (in the position detecting mode) and active signals (in the data receiving mode). In a conventional capacitive touch system, detecting passive signals and active signals is required to be switched in a synchronous manner. The manner of delaying the time period in the capacitive touch system of the present disclosure is simpler than the synchronous manner in the conventional capacitive touch system.

Figure 8:
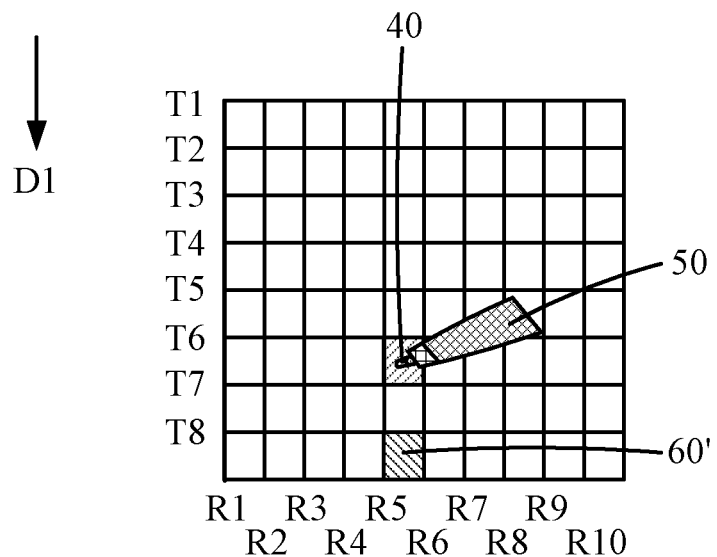
FIG. 8 illustrates that the touch is detected and data is transmitted by the external device.
Figure 9:
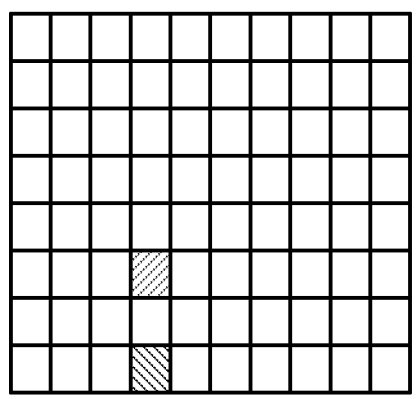
FIG. 9 illustrates a data structure for storing the data of the touch and the data transmitted by the external device.

Please refer to FIG. 8 and FIG. 9. FIG. 8 illustrates that the touch 40 is detected and data 60' is transmitted by the external device 50. FIG. 9 illustrates a data structure for storing the data of the touch 40 and the data 60' transmitted by the external device 50.

As shown in FIG. 9, the data of the detected touch 40 is stored in a corresponding position of the data structure (in the position detecting mode). After a time delay period (e.g., after a time period of delaying to drive at least one of the driving wires T1-T8), the data 60' transmitted by the external device 50 is stored in a corresponding position of the data structure (in the data receiving mode). When a last one (i.e., the driving wire T8) of the driving wires T1-T8 is driven, the data 60' starts to be received. However, only a part of the data 60' having a length of driving one driving wire (i.e., the driving wire T8) can be received. That is, the data 60' having a length of driving two driving wires is lost when compared with the data 60 in FIG. 7.

In order to solve the above-mentioned problem in the data receiving modem, in one embodiment, the touch control chip 20 in FIG. 1 drives the last one (i.e., the driving wire T8) of the driving wires T1-T8 for a plurality of times. The times of driving the last one (i.e., the driving wire T8) of the driving wires T1-T8 can depend on a length of the data 60 and can be preset according to the length of the data 60. In FIG. 8, the last one (i.e., the driving wire T8) of the driving wires T1-T8 should be driven for at least three times, so that the complete data 60 shown in FIG. 7 can be received.

In another embodiment, the touch control chip 20 in FIG. 1 sequentially drives the driving wires T1-T8 in a first direction D1. After the last one (i.e., the driving wire T8) of the driving wires T1-T8 is driven, the touch control chip 20 in FIG. 1 sequentially drives the driving wires T8-T1 in a direction opposite to the first direction D1. That is, after the touch control chip 20 in FIG. 1 sequentially drives the driving wires T1-T8, the touch control chip 20 sequentially drives the driving wires T8-T1. When the touch control chip 20 sequentially drives the driving wires T8-T1, the touch control chip 20 can continuously receive the data transmitted by the external device 50, thereby receiving the complete data 60 in FIG. 7 to avoid the loss of the data 60.

Figure 10:
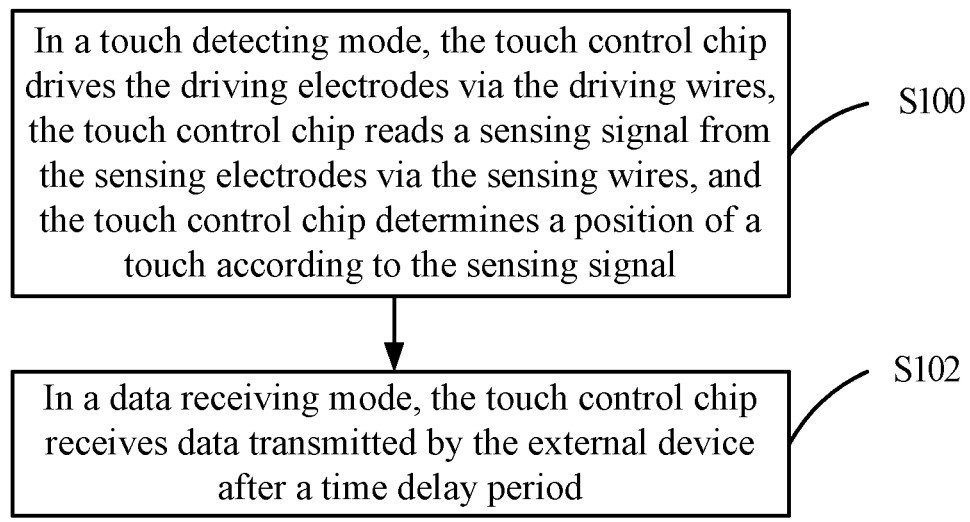
FIG. 10 illustrates a flowchart of a sensing method of a capacitive touch system in accordance with an embodiment of the present disclosure.

Please refer to FIG. 10. FIG. 10 illustrates a flowchart of a sensing method of a capacitive touch system in accordance with an embodiment of the present disclosure.

The capacitive touch system includes a touch panel, a touch control chip, and an external device. The touch panel includes a plurality of driving electrodes, a plurality of sensing electrodes, a plurality of driving wires, and a plurality of sensing wires. Each of the driving electrodes is connected to one of the driving wires. Each of the sensing electrodes is connected to one of the sensing wires. The sensing method of the capacitive touch system includes the following operations.

In block S100, in a touch detecting mode, the touch control chip drives the driving electrodes via the driving wires, the touch control chip reads a sensing signal from the sensing electrodes via the sensing wires, and the touch control chip determines a position of a touch according to the sensing signal.

In block S102, in a data receiving mode, the touch control chip receives data transmitted by the external device after a time delay period.

In the data receiving mode, the touch control chip drives a last one of the driving wires for a plurality of times. Alternatively, the touch control chip sequentially drives the driving wires in a first direction. After the last one of the driving wires is driven, the touch control chip sequentially drives the driving wires in a direction opposite to the first direction.

The above-mentioned time delay period includes a time period of delaying to drive at least one of the driving wires. In the time period of delaying to drive the at least one of the driving wires, the sensing wires do not sense the touch 40 (do not receive signals).

In the capacitive touch system and the sensing method thereof, the position detecting mode and the data receiving mode can be sequentially performed by delaying the time period. Furthermore, the capacitive touch system and the sensing method thereof of the present disclosure provide two driving methods, so as to avoid that complete data cannot received.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A capacitive touch system, comprising:
a touch panel comprising a plurality of driving electrodes, a plurality of sensing electrodes, a plurality of driving wires, and a plurality of sensing wires, wherein each of the driving electrodes is connected to one of the driving wires, and each of the sensing electrodes is connected to one of the sensing wires;
a touch control chip electrically connected to the touch panel; and
an external device configured to transmit data to the touch control chip via the touch panel,
wherein in a touch detecting mode, the touch control chip drives the driving electrodes via the driving wires, the touch control chip reads a sensing signal from the sensing electrodes via the sensing wires, and the touch control chip determines a position of a touch according to the sensing signal, wherein the touch generates passive signals,
in a data receiving mode, the touch control chip receives data transmitted by the external device after a time delay period, wherein the data is active signals generated by the external device,
wherein in the data receiving mode, the touch control chip continuously drives a last one of the driving wires for a plurality of times to receive all of the data, and the times depend on a length of the data.

2. The capacitive touch system according to claim 1, wherein the time delay period comprises a time period of delaying to drive at least one of the driving wires.

3. The capacitive touch system according to claim 2, wherein the sensing wires do not sense the touch in the time period of delaying to drive the at least one of the driving wires.

4. A sensing method of a capacitive touch system, the capacitive touch system comprising a touch panel, a touch control chip, and an external device, the touch panel comprising a plurality of driving electrodes, a plurality of sensing electrodes, a plurality of driving wires, and a plurality of sensing wires, each of the driving electrodes being connected to one of the driving wires, and each of the sensing electrodes being connected to one of the sensing wires, the sensing method of the capacitive touch system comprising:
driving the driving electrodes via the driving wires by the touch control chip, reading a sensing signal from the sensing electrodes via the sensing wires by the touch control chip, and determining a position of a touch according to the sensing signal by the touch control chip in a touch detecting mode, wherein the touch generates passive signals; and
receiving data transmitted by the external device by the touch control chip after a time delay period in a data receiving mode, wherein the data is active signals generated by the external device,
wherein in the data receiving mode, the touch control chip continuously drives a last one of the driving wires for a plurality of times to receive all of the data, and the times depend on a length of the data.

5. The sensing method of the capacitive touch system according to claim 4, wherein the time delay period comprises a time period of delaying to drive at least one of the driving wires.

6. The sensing method of the capacitive touch system according to claim 5, wherein the sensing wires do not sense the touch in the time period of delaying to drive the at least one of the driving wires.

* * * * *